J. PETERSON.
APPARATUS FOR TAGGING OR LABELING PLUGS OF TOBACCO.
APPLICATION FILED FEB. 26, 1918.

1,274,934.

Patented Aug. 6, 1918.
7 SHEETS—SHEET 1.

Inventor,
Jonathan Peterson.
By his Attorneys,
Meyers, Cushman & Rea

J. PETERSON.
APPARATUS FOR TAGGING OR LABELING PLUGS OF TOBACCO.
APPLICATION FILED FEB. 26, 1918.

1,274,934.

Patented Aug. 6, 1918.
7 SHEETS—SHEET 2.

Inventor,
Jonathan Peterson.
By his Attorneys,

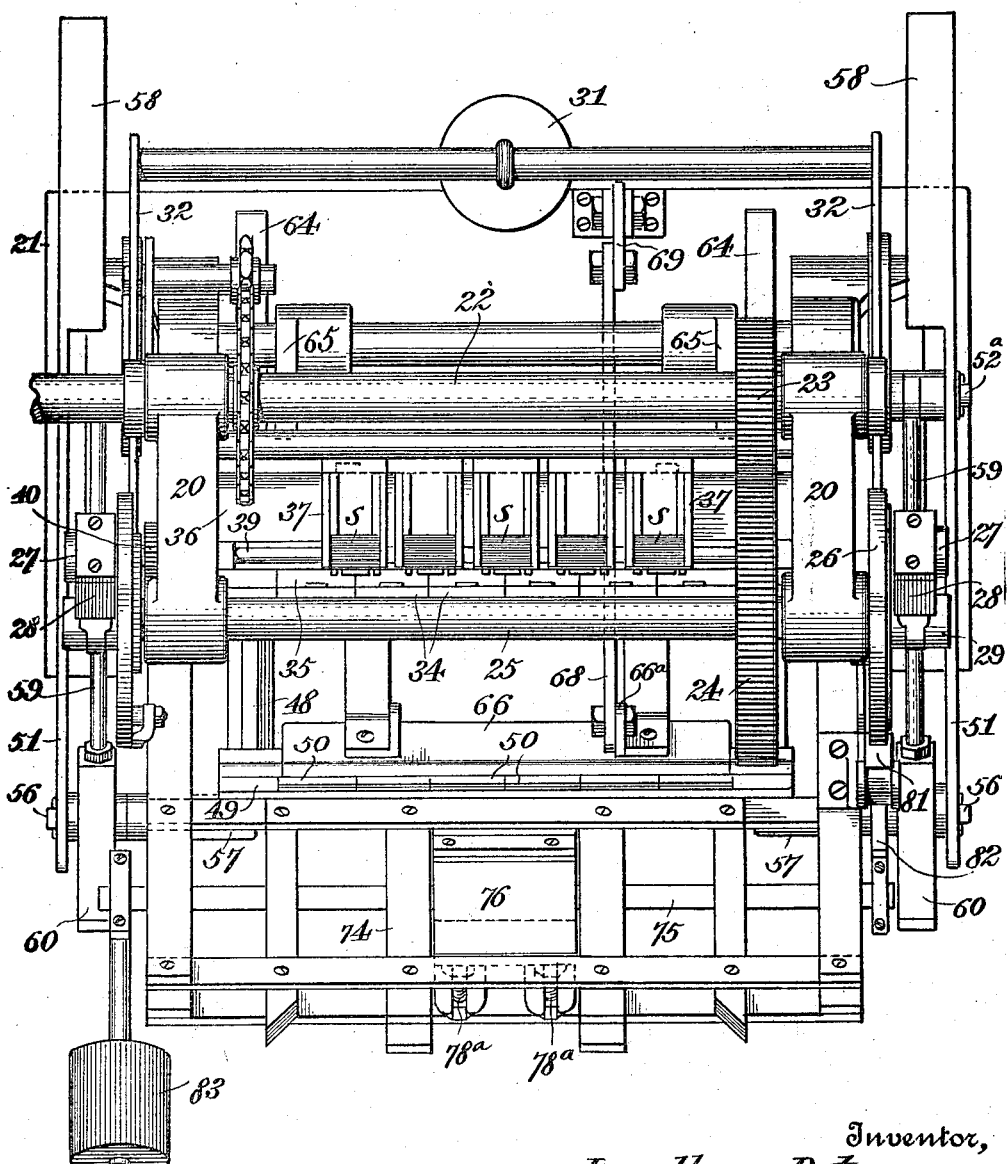

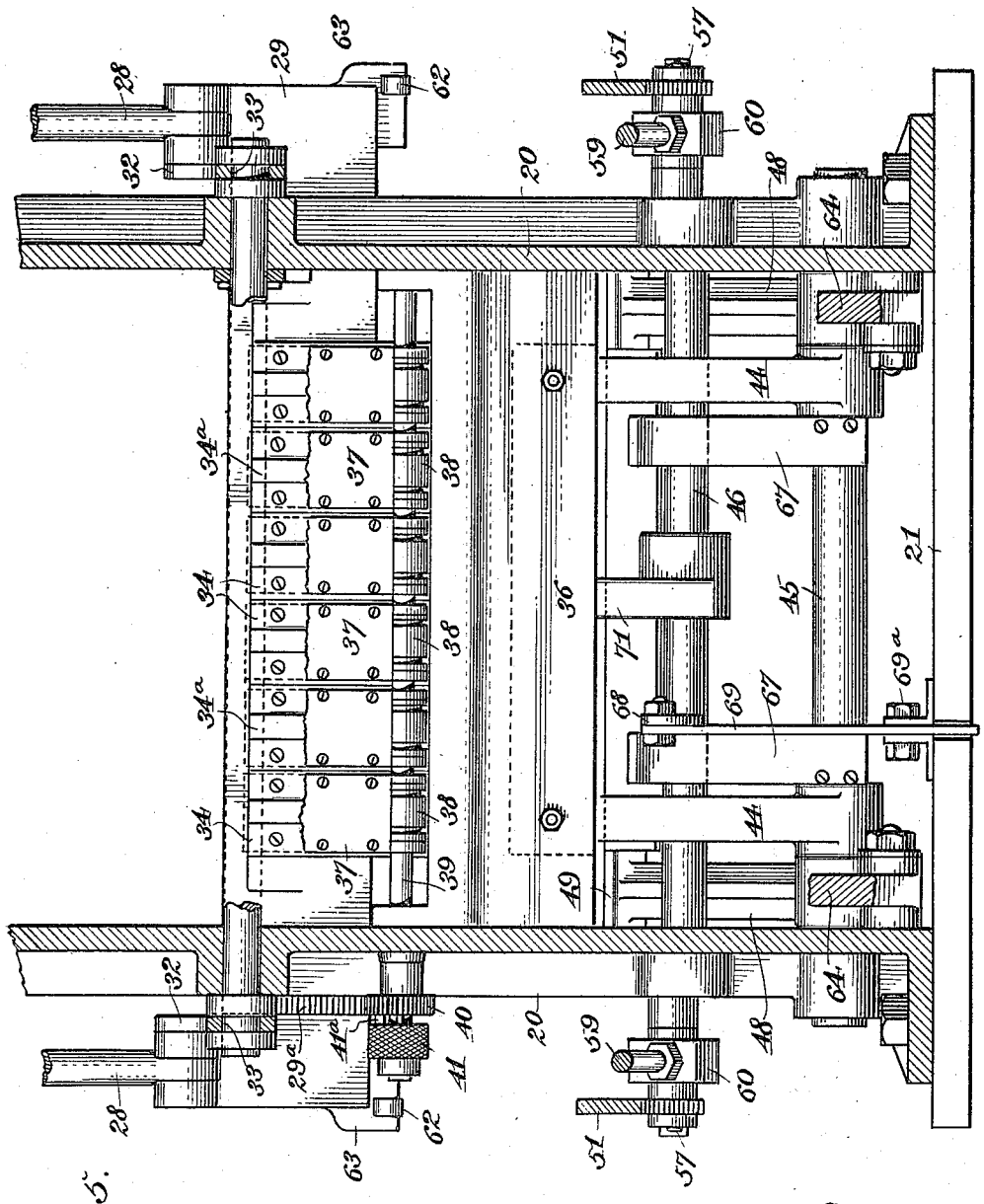

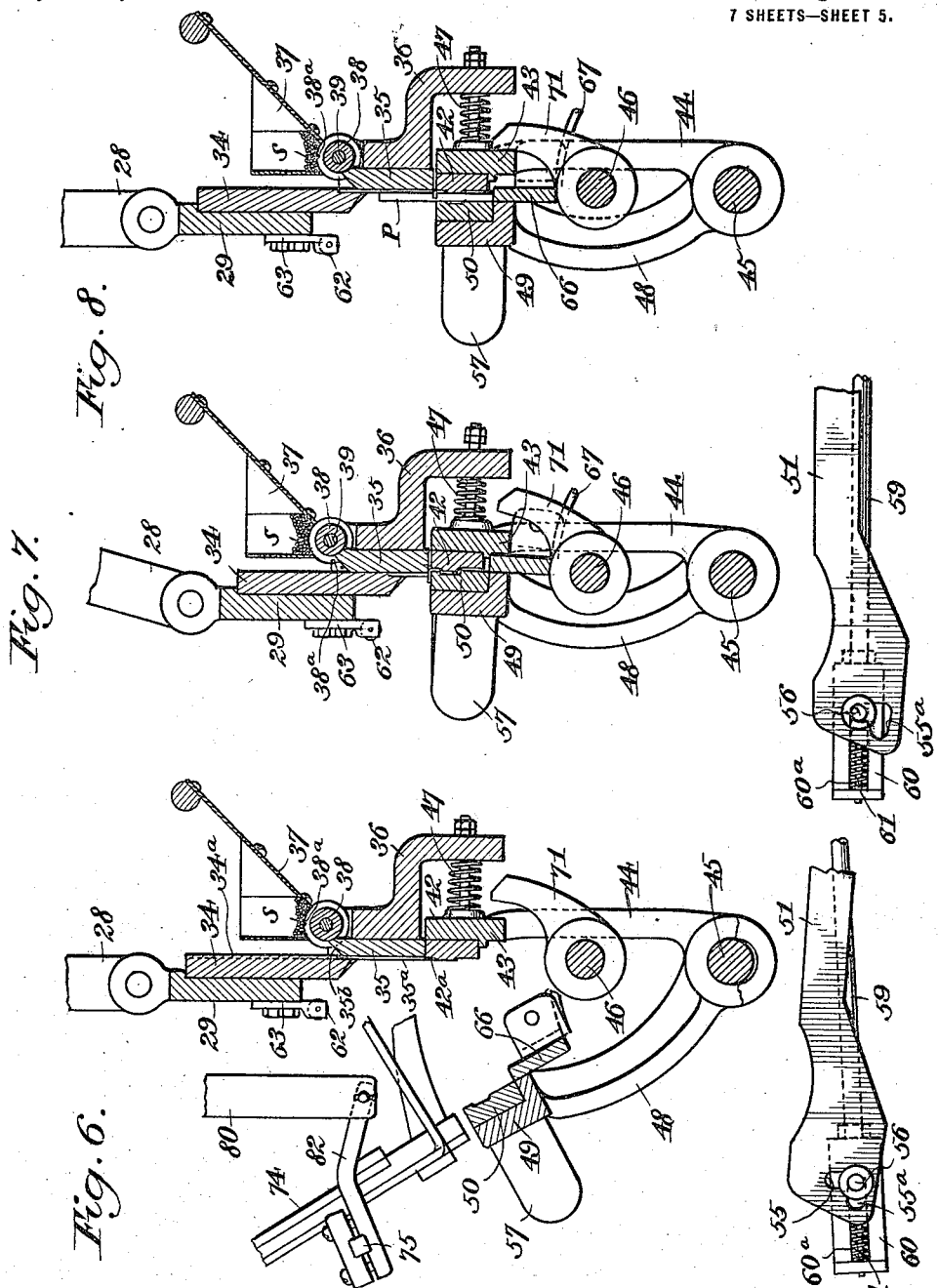

J. PETERSON.
APPARATUS FOR TAGGING OR LABELING PLUGS OF TOBACCO.
APPLICATION FILED FEB. 26, 1918.
1,274,934.
Patented Aug. 6, 1918.
7 SHEETS—SHEET 6.
Fig. 9.
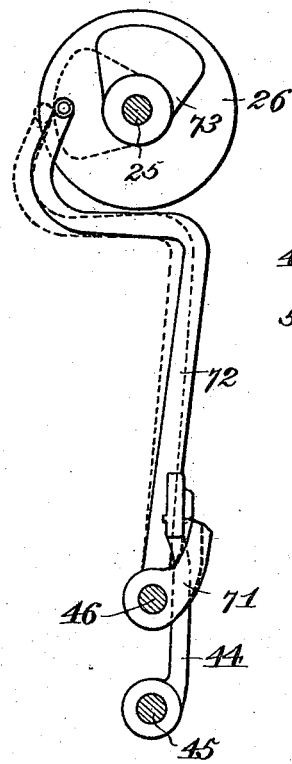
Fig. 10.
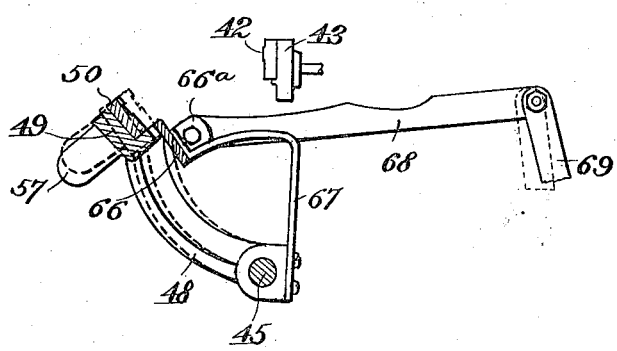
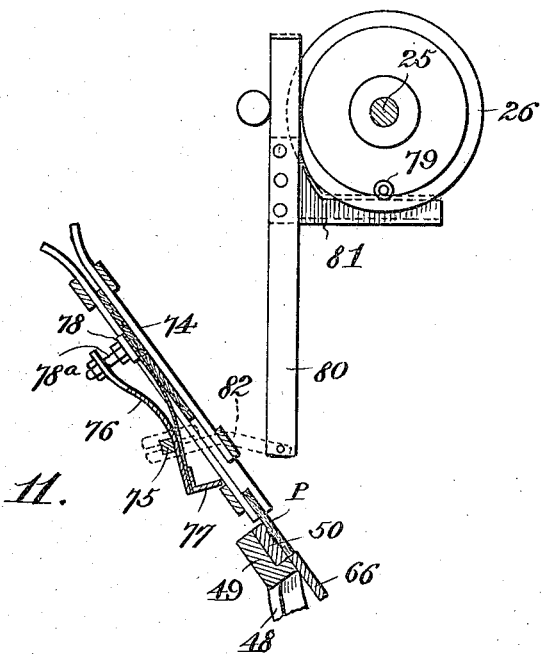
Fig. 11.
Inventor,
Jonathan Peterson.
By his Attorneys,
Meyers, Cushman & Rea J. PETERSON.
APPARATUS FOR TAGGING OR LABELING PLUGS OF TOBACCO.
APPLICATION FILED FEB. 26, 1918.
1,274,934.
Patented Aug. 6, 1918.
7 SHEETS—SHEET 7.
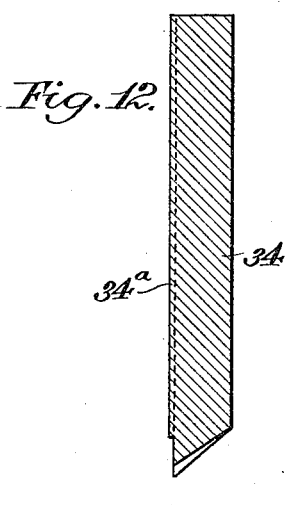
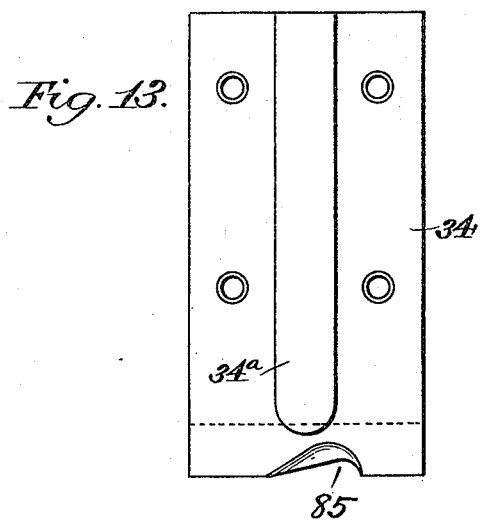
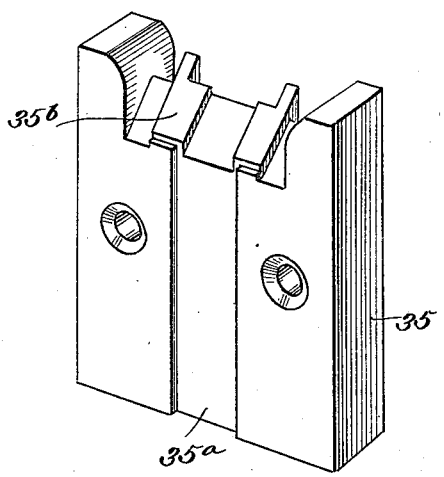
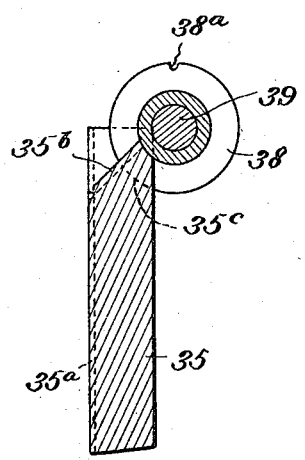
Inventor,
Jonathan Peterson.
By his Attorneys,

UNITED STATES PATENT OFFICE.

JONATHAN PETERSON, OF BROOKLYN, NEW YORK.

APPARATUS FOR TAGGING OR LABELING PLUGS OF TOBACCO.

1,274,934.

Specification of Letters Patent.

Patented Aug. 6, 1918.

Application filed February 26, 1918. Serial No. 219,293.

*To all whom it may concern:*

Be it known that I, JONATHAN PETERSON, a citizen of the United States, residing at Brooklyn, in the county of Kings and State of New York, have invented new and useful Improvements in Apparatus for Tagging or Labeling Plugs of Tobacco, of which the following is a specification.

This invention relates to improvements in apparatus for tagging or labeling plugs of tobacco.

While it has been the practice for many years to apply labels of various types to a face or faces of a tobacco plug—for identifying the product of a manufactory or for trade-mark purposes—the character of the label-securing means or the ability to provide the label application at low cost and in a more or less automatic manner, have been sources of difficulty which have been borne by the manufacturers because of the general advantage of the use of a label and the failure to provide a more efficient substitute.

Identification labels have been of different types, some being of metallic form which are applied at predetermined points in the direction of length of a manufactured plug—severance of the plug into sections by the retailer leaving each section with an individual label—thus employing a label entirely of metal. Other types employ a paper label which is attached to the plug section by suitable means, as by a tack or a sheet metal structure formed with prongs. And as the plug is generally manufactured as a unit and afterward cut into sections, the label has, in some instances, been in the form of a strip of paper which is secured at intervals by these fastening devices, the applying apparatus being designed to apply all of the devices at one operation, this generally being by hand or intermittent operation, owing to the general character of the fastening devices and the necessity for providing a plurality of them at spaced apart points, necessitating a more or less gang operation.

The fastening devices heretofore employed, have generally been such as to form an important part of the identifying or trade-mark device, due possibly to the fact that the devices, if capable of efficient service in securing the paper label in position, were of such formation as to present a considerable exposed area of the device, making it practically impossible to consider the formation as a minor feature of the identifying device. As a result, the fastening device has practically formed the principal feature of the identifying structure or trade-mark.

While there have been instances where the device was made inconspicuous—as where formed of wire—such devices have been objectionable for the reason that the exposed portion of the wire has provided but a single thin line across the label, thus presenting the objectionable feature of little or no use as an attaching device excepting where the strip being secured is formed rather stiff—as by the use of sheet metal or cardboard, materials which are not easily torn or broken. Such constructions therefore did not aid in solving the problem since any gain that was made in the attaching device was more than offset by the loss requiring an entirely different type of material for the strip which was to be applied.

The present invention is designed more particularly to meet these objections by employing a fastening device or staple which is capable of properly affixing paper labels which are relatively thin and more or less flexible, devices which in themselves are inconspicuous when in position and which will enable the paper strip itself to carry all or a major portion of the identification or trade-mark, it being understood, of course, that a portion of the device is necessarily exposed and hence can, if desired, be considered as an identification element, although the device itself is of such formation as to permit of almost complete exposure of the label when in position.

This general result is obtained by forming the device of short lengths of wire, the machine of the present invention being designed to take such lengths and to first shape them into individual fastening devices or staples and then apply the shaped devices to the plug in such manner as to attach the label thereto. The present machine is designed to operate as a gang machine in that the necessary number of devices for a plug are applied concurrently, but the general principles of the invention may be employed in connection with an operating unit adapted to shape and apply a single device, in which case small plugs of the size of the usual section may be operated upon or the devices for the manufactured plug applied by successive operations.

The invention also contemplates a machine which is more or less automatic and substantially continuous in operation, durable in construction, capable of operation at comparatively high speeds by reason of automatic formation of staples, which can be manufactured at a relatively low cost, and which will provide the labeling operation at a minimum cost.

To these and other ends, the nature of which will be readily understood as the invention is hereinafter disclosed, said invention consists in the improved construction and combination of parts hereinafter fully described, illustrated in the accompanying drawings, and more particularly pointed out in the appended claims.

In the accompanying drawings, in which similar reference characters indicate similar parts in each of the views:

Fig. 4 is a top plan view.

Fig. 5 is a sectional view taken on line 5—5 of Fig. 2.

Figs. 6, 7 and 8 are diagrammatic sectional views indicating positions of parts at different stages of the operation.

Fig. 9 is a diagrammatic view indicating the operation of an intermittently-operating holding device.

Fig. 10 is a detail view showing the manner in which the labeled plug is released from the machine.

Fig. 11 is a detail view showing mechanism for controlling the feed of plugs to the attaching mechanism.

Figs. 12 and 13 are sectional and face views of a reciprocating die.

Fig. 14 is a perspective view of a stationary die.

Fig. 15 is a detail sectional view of the die shown in Fig. 14 and of the wire blank feed roll coöperating therewith.

Figure 1:
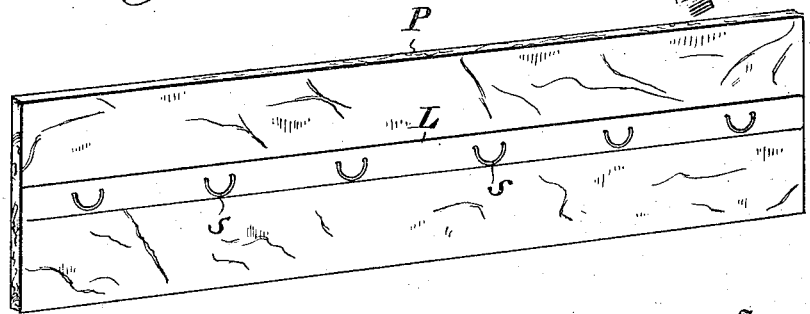
Figure 1 is a perspective view of a manufactured plug of tobacco showing a label attached thereto by a plurality of securing devices, fasteners or staples.
Figure 3:
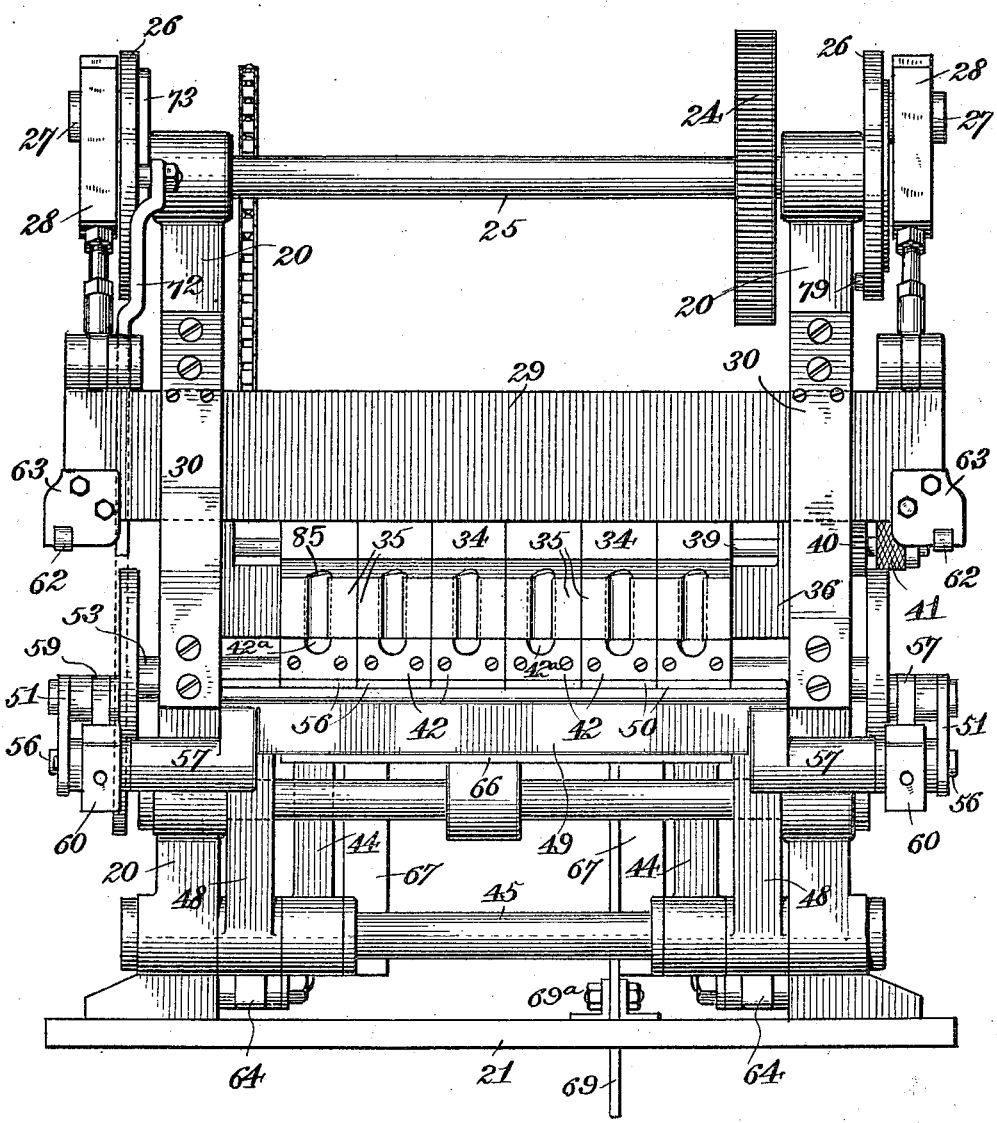
Fig. 3 is a front elevation of the machine with the plug-feeding mechanism omitted.

As shown in Fig. 1, in which a plug of tobacco is indicated at P, a label at L, and a fastening device or staple at S, labeling of the plug is had by attaching a paper label to a face of the plug by the use of fastening devices or staples formed of wire, these staples being in the form of a semi-circular body-portion which overlies the label, the ends of these portions being bent laterally to form prongs, the prongs passing through the label into the plug. As shown in this view, a plurality of these devices are employed in the direction of length of the plug, the devices being substantially equi-spaced while the label is continuous. This particular arrangement is preferably employed for the reason that the manufactured plug is designed to be cut into sections, the line of severance being at a suitable point between adjacent devices, the result being that each section—forming the user's plug—carries the label and one of the fastening devices, assuming the maximum sectional division. The machine of the present invention is designed to provide the setting of the several staples simultaneously, but it will be understood, of course, that the general principles of the machine may be embodied in an apparatus designed for applying but a single fastening device or staple.

As will be seen, the staple presents but a narrow face overlying the label, this face being the width of the wire, thus covering only a minimum portion of the label so that the latter may carry substantially the entire identifying or trade mark; and where the general coloring of the label is such as to approach the color of the wire, the presence of the latter is less perceptible and decreases the possible effect of detraction by the fastening device, permitting the label itself to present the major portion of the identifying or trade-mark desired. Since a paper strip can be readily ornamented by the lithographer, it will be readily understood that the ability to employ a fastening device formed entirely of wire tends to decrease the cost of the labeling operation through the decrease in cost of the labels and of the fastening device as compared with label application wherein the fastening device either provides the entire identification structure or a major portion of the identifying device.

The ability to employ wire in the formation of the fastening device where the label is of comparatively thin paper, is due to the fact that the effectiveness of the device as a retaining element for the label is due to the fact that the staple body-portion extends over a considerable length of the label, although the staple itself simply penetrates the label at two spaced-apart points. This effect is had by reason of the fact that the portion of the device which overlies the label is semi-circular, thus producing the effect of a solid structure having a radius equal to the radius of the curved wire body-portion and at the same time omits the major portion of such solid structure. Aside from the advantage of the minimum amount of material exposed, another advantage results from the ability to fashion or shape the wire blank into the device formation in a simple manner and then apply it to position on the plug, the entire operation being more or less automatic in character. And where a plurality of the fastening devices are employed, this advantage becomes of greater importance, in that it permits of the use of individual fastening devices or staples as a part of a general assembly which will permit of the application of all of the devices concurrently, operating more or less on the gang principle and providing for substantially continuous operation.

The apparatus disclosed for providing this general operation and which is presently described in detail, is designed to concurrently apply six fastening devices to the plug, six wire blanks being operated on concurrently. For the purposes of explanation, excepting where necessary in describing the gang idea, the description will more particularly refer to a single device, the major portions of the apparatus being formed of units which are substantially duplicates. Before entering into a detail description of the mechanism, a brief general description of the operation is had to permit a clear understanding of the invention.

The wire blanks from which the staples or fastening devices S are formed, and which are simply straight lengths of wire sufficient to provide the formation, are carried in individual hoppers from where they are fed— one at a time—to the throats of die structures, one part of which is stationary, the other part reciprocating vertically. When the wire blank is delivered, the reciprocating die moves the blank downwardly within a channel of the stationary die, this channel being of less width than the length of the blank, while the movable die, which carries a portion which extends into this channel, has this portion of less width than the channel, with the result that the downward movement of the movable die shapes the blank into a U-shaped formation—the embryo staple—the lower face of this portion of the movable die being curved to form the anvil on which the curved shape of the U-shape is formed. This embryo staple is carried downward into a supporting die which receives the lower or body-portion of the staple, the free ends—which trail during the passage through the channel—projecting beyond this latter die, remaining in the channel.

During this shaping of the blank, a member, mounted to oscillate, is approaching this supporting die, and as the movable shaping die is receding, this latter member is brought into contact with the supporting die (now carrying the lower or body portion of the blank), thus clamping this lower portion in position, after which this clamping member and supporting die are moved in the direction of advance of this clamping member— transverse to the direction of movement of the embryo staple in the stationary die— with the result that the projecting ends of the blank formation are bent laterally at substantial right angles to the plane of the curved or body portion of the staple. And when in this position, the clamping member and die may be shifted upwardly to a slight extent to set these laterally projecting ends— which are thus formed into prongs—and which may serve to sharpen the prongs. This movement of the supporting die is against the action of a spring, so that as said member recedes, the die returns to its normal position and locates the shaped staple with its curved body portion in the original plane and with the prongs projecting toward the receding member.

The movement of the oscillating member carries it past the lower end of a feeding device for the plug of tobacco and its label and, during the succeeding advance of this member, a plug is released from the feeding device and delivered on to this member which then again advances, this second advance, however, carrying the plug in proper position to permit the fastening device or staple to be applied.

In the present embodiment of the invention, the label is not placed in position on the plug by the mechanism, being located thereon and temporarily secured to the face of the plug by paste or adhesive prior to delivery to this oscillating member, it being understood that the plug positioned on this member has the label adhesively applied at the proper point to the face of the plug.

While, during the first advance movement of this member, the supporting die yielded in order to provide the prong formation, this yielding action is prevented during the second advance of the oscillatory member, a holding mechanism coming into activity to prevent yielding action by this die. When, therefore, the member advances the second time, carrying the plug, the latter will be brought into contact with the projecting prongs and these prongs will be forced through the label into the body of the plug, thus applying the device in position. And during this applying operation, the difference in length of movement of the oscillating member is compensated by yielding of the member itself. This arrangement provides for the mounting of the oscillating member and the supporting die as yieldable, but the operating mechanism is such that during the first advance movement of the member, the member itself is positively held against yielding, the die being yieldable, while during the second advance of this member, the latter is made yieldable and the die positively held against yielding movement. As a result, the prong-forming operation is provided with a positive amount of pressure produced by the action of the mechanism, while the pressure application during the securing of the label by the device is that which is provided by the springs which permit the member-yielding movements.

The application of the staple is completed during the second advance movement of the oscillating member, the second retreat of this member carrying the plug with it, and during the return movement of the member, the latter is manipulated in such manner as to automatically drop the plug from the position thereon, thus discharging the plug from the apparatus and completing the general cycle of operations.

From the above it will be understood that the oscillating member and the supporting die which coöperates therewith during the prong-forming and device-applying operations, are brought into complemental operation twice during each cycle of the apparatus—with the member having practically two cycles of movement—while but one wire blank and a single plug of tobacco are delivered during such general cycle, so that the apparatus is designed in such manner that one set of complemental instrumentalities are made operative in both the staple-shaping and the staple-applying operation, thus greatly simplifying the structural details of the apparatus, making it possible to provide the desired operation by the use of a comparatively simple and efficient apparatus which operates at comparatively high speed.

In describing the structure in detail, I will, as far as possible, follow this general sequence of operation.

The general frame work of the machine embodies two standards 20 rising from a base 21, these standards carrying generally the operating parts of the machine.

22 designates the drive shaft, driven from a suitable power source, indicated conventionally by a pulley 22$^a$, this shaft being supported by the standards. Mounted on shaft 22 is a gear 23 which meshes with a gear 24 mounted on a separate shaft 25, gear 24 preferably having a diameter twice the diameter of gear 23, so that two revolutions of shaft 22 will provide a single revolution to shaft 25.

Mounted on the ends of shaft 25, preferably outside of standards 20, are disks 26, each disk carrying a wrist pin 27 which extends into a slot 28$^a$ of a pitman 28, this slot being elongated in its direction of length, and having a length sufficient to provide the proper operation of the pitman as presently described. Pitman 28 is of a more or less composite structure, the opposite end being pivotally connected to a die-carrying plate 29, the pitman being formed to permit of adjustment in its length in order that the length of movement of plate 29 can be properly adjusted. Plate 29 is adapted to travel vertically within guides 30, the latter being arranged to form a stop for the plate movement in an upward direction, the plate being normally held in this upper position through the action of a weight 31 carried by lever 32, the latter being pivoted at a point intermediate its length, as at 33, the opposite end of this lever being pivotally connected to plate 29.

Figure 2:
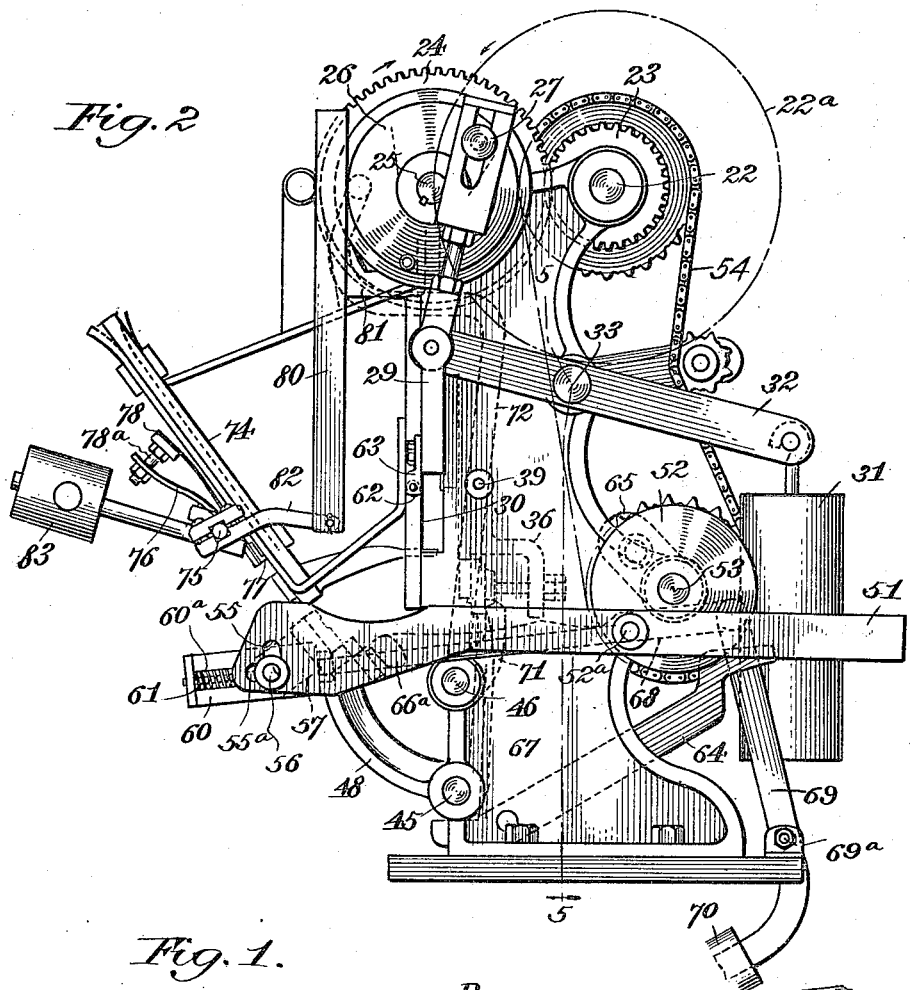
Fig. 2 is an end elevation of one embodiment of machine for attaching the label in the manner indicated in Fig. 1.

By this particular arrangement, it will be understood that during rotation of disk 26 in the direction of the arrow in Fig. 2, wrist pin 27 will travel freely in slot 28$^a$ during the travel of the pin in the upper portion of the disk revolution, pitman 28 shifting its position by the travel of the wrist pin. When travel of the wrist pin causes it to reach the bottom end of the slot, further travel of this pin will advance the pitman downwardly, thus forcing plate 29 downward within its guides, this downward movement of plate 29 continuing until the wrist pin reaches its lowest point of travel, whereupon it again passes upwardly to complete the revolution. As will be understood, this downward movement of plate 29 is in opposition to the action of weight 31, and hence when the wrist pin begins its travel in an upward direction, said weight will cause the pitman to follow the wrist pin movements, thus raising plate 29 until it again passes into contact with the guide stop, whereupon further upward movement of the pitman ceases, the wrist pin traveling freely within slot 28$^a$.

As shown, this operating mechanism is preferably duplicated at opposite sides of the machine, so that plate 29 travels uniformly and substantially free from variation, a desirable feature for reasons presently pointed out.

Plate 29 carries a series of die members 34, these being arranged side by side—in contact or spaced-apart—and coöperating with complemental stationary die members 35 carried by a supporting member 36 secured to standards 20, die members 35 being also arranged side by side, the number and position of the two sets of die members being determined by the number of fastening devices required in applying the label and the particular positions of these devices in the length of the label.

As shown in Figs. 12 and 13, each die member 34 has a face in opposition to the face of the stationary die 35, the latter, as shown in Fig. 14, having a channel 35$^a$ extending vertically. Die 34 is provided with a raised rib 34$^a$ which enters into channel 35$^a$, this rib, as indicated in Fig. 13, having its lower end curved. Rib 34$^a$ is of less width than channel 35$^a$ and is so positioned relative thereto as to provide equal spaces between the opposing side faces of the channel and the rib, these spaces having a width approximately equal to the thickness of the wire blank.

The upper end of die member 35 is preferably provided with a bevel face 35$^b$ leading downwardly toward the front face of the die, this bevel face being intersected by a bevel face 35° which extends downwardly to the rear of the member, this latter bevel—which may be somewhat curved—coöperating with the wire blank delivery roll as presently described. Bevel face 35ᵇ is, for structural reasons, more or less irregular, but is adapted to form a runway for the wire blank when delivered at the upper end of the bevel, the blank moving down over the face toward the front of the die. As the curved lower end of rib 34ᵃ is spaced from the bottom of die 34, and the normal position of the parts is such that the lower end of this rib is spaced above the bottom of the lower end of bevel face 35ᵇ (Fig. 8), while the face of die 34 below this rib contacts with the face of die 35, it will be understood that, with the parts in normal position, the movement of a wire blank downward over bevel face 35ᵇ will cause it to pass into contact with this face of die 34 below the rib, thus positioning the blank at a point where downward travel of die 34 will bring the curved face of rib 34ᵃ into proper relation to the blank positioned therebelow. These parts may therefore be considered as a throat into which the wire blank is delivered ready for the shaping operation presently described.

The wire blanks may be fed to this throat in any desired manner, as for instance by any well-known mechanism which will produce a straight wire blank of the desired length. For the purpose of disclosure, I have shown a simple arrangement by means of which individual blanks can be fed from hoppers—one hopper for each throat—an arrangement which will permit the blank to be formed in a separate machine and introduced in quantities into the hoppers from where they are discharged individually.

The hoppers are indicated at 37, the bottom of the hopper being formed by a roll 38, the several rolls of the hoppers being axially alined—as by being mounted on a single shaft 39 carried by the standards—one end of said shaft carrying a gear or pinion 40—loose on the shaft—which meshes with a rack tooth section 29ᵃ carried by plate 29. This loose mounting of gear or pinion 40 is preferred, since it may be desirable to operate the machine at times without delivery of blanks, as during testing operations, etc., and a suitable clutch mechanism is preferably provided between shaft 39 and gear or pinion 40, this being shown as a member 41 mounted on and movable with shaft 39, being keyed thereto to permit of movement longitudinally of the shaft, member 41 carrying a pin 41ᵃ adapted to enter a complemental recess in gear 40.

Rolls 38 are each provided with a longitudinal recess or groove 38ᵃ having a size and depth sufficient to receive one of the wire blanks, this groove, in the normal position of plate 29, being in the upper portion of the roll and therefore open to the interior of the hopper, thus permitting of the ready entrance of a blank into the groove. The roll extends into a recess of which bevel face 35ᶜ of die 35 forms a wall, and when plate 29 begins its downward movement, the engagement between gear 40 and the rack teeth 29ᵃ, will cause the roll to rotate and carry the blank, positioned in the groove, out of the hopper into the recess above bevel face 35ᵇ of die 35. Since each roll 38 is also grooved peripherally as at 38ᵇ a depth substantially equal to the depth of groove 38ᵃ, and the bevel face formation at the upper end of die 35 has portions which project into these grooves 38ᵇ, it will be readily understood that as the roll rotates, carrying the blank with it, the blank will reach a point where these projecting bevel portions will force the blank out of groove 38ᵃ on to inclined or bevel face 35ᵇ over which the blank travels into position ready for action.

The downward movement of plate 29 may cause groove 38ᵃ to move some distance beyond these projecting beveled portions, but the movement is not sufficient to carry this groove entirely around so as to reënter the hopper on the opposite side. Consequently, when plate 29 retreats, shaft 39 will be moved in the opposite direction, thus causing groove 38ᵃ to move in the opposite direction and return to position within the hopper ready to receive the succeeding wire blank.

As shown in Fig. 14, bevel face 35ᵇ of die member 35 has an over-all length greater than the width of channel 35ᵃ, the latter being located substantially midway of this over-all length. When, therefore, the wire blank—which has a length less than this bevel face but greater than the width of the channel—moves downward over the bevel face into the throat, the intermediate portion of the blank is located at the upper end of this channel. And since rib 34ᵃ of die member 34 is located centrally of this channel, it will be readily understood that when plate 29 begins its downward movement, the curved lower end of this rib will contact with the central portion of the length of the wire blank and carry the blank into the channel, the blank being shaped to the curved face of the rib and having the ends extending upwardly—trailing the curved central portion of the blank—giving the blank a U-shaped configuration—the trailing ends passing downward in the spaces between the opposing side faces of the rib and channel. This relation continues throughout the downward travel of die member 34, the movement of the shaped blank being positive and in a true vertical plane due to the complemental shapes of the die members which practically form a housing within which the shaped blank or embryo staple travels.

Located below die 35 is a supporting die 42, this latter die being carried by a bar 43 forming part of an oscillatory frame 44 pivotally mounted on a rod or shaft 45 which extends throughout the width of the machine, this frame being normally held in a position where a recess 42$^a$ of die 42 is in vertical alinement with the lower end of channel 35$^a$, the movement of frame 44 in one direction being limited in suitable manner to locate this recess, as for instance, by contact of the frame with a rod or shaft 46 or with a collar or other stop structure mounted on said latter rod or shaft (Fig. 6). Frame 44 is normally held in this position by a spring 47 located between member 36 and bar 43, this spring structure permitting yielding of frame 44 by the operation of mechanism presently described.

As will be understood, frame 44 has a length sufficient to carry the desired number of die members 42, these members corresponding in number and position to die members 34 and 35; hence recesses 42$^a$ of die members 42, in normal position, form continuations of channels 35$^a$.

The reciprocating movement of plate 29 is sufficient to carry the curved portion of the shaped blank into recess 42$^a$ of die member 42, the portion of the die 34 below the lower end of rib 34$^a$ passing over the face of die member 42. As a result, the embryo staple will be carried to a position where its curved portion and a portion of the legs thereof is located within recess 42$^a$, while the remainder of the legs of the formed blank or U-shaped staple will remain within channel 35$^a$, the legs tending to frictionally engage the side walls of the latter in this position. Hence when plate 29 begins its retreating movement, rib 34$^a$ will simply leave its position within the staple, leaving the latter in the position in which it was placed by the downward movement of the plate.

As heretofore pointed out, the positioned blank or staple is subjected to an action which bends a portion of the legs of the staple at substantial right angles to the general plane of the latter. This operation is provided by the following mechanism:

48 designates a frame mounted on rod or shaft 45, this frame including a bar 49 which extends across the machine in front of the parts heretofore described, the frame having dimensions such that when moved pivotally with rod or shaft 45 as an axis, the frame will move to a position where a member or members 50—carried by bar 49—will be brought into direct opposition to die member 42 (Fig. 7), member or members 50 being formed in such manner as to practically clamp the curved portion of the staple within recess 42$^a$ thus holding this portion of the staple fixedly in position. Member or members 50 may therefore be considered as clamping members and may obviously be in the form of a single member or a plurality of members located on bar 49 in proper position to co-act with the corresponding die members 42.

The mechanism for oscillating frame 48 consists mainly of a pair of arms or levers 51—one being located at each side of the machine—each lever being mounted, intermediate its ends, on a wrist pin 52$^a$ carried by a disk 52 mounted on a shaft 53, the disks being duplicated, one for each arm or lever. Shaft 53 is driven from shaft 22 through a suitable drive connection—shown as a sprocket wheel and chain connection 54—the connection being such that shaft 53 rotates at the same speed as shaft 25, so that disks 52 have two complete revolutions during the single revolution of disk 26.

The advance ends of arms or levers 51 are each provided with a reversely-arranged L-shaped slot—the two branches of the slot being indicated at 55 and 55$^a$—into which pins 56 extend, these pins being carried by brackets 57 secured to bar 49 of frame 48. The opposite ends of arms or levers 51 are weighted, as at 58, these weighted ends or counter-balances tending to normally hold the arms or levers in position so that pins 56 will be normally located at the juncture of the slot branches, thus placing the arms or levers normally in position where a lost motion action may be provided between pins 56 and levers 51 by movements of the levers in the direction of frame advance, the pins traveling in branch 55$^a$ of the slots during this lost motion action.

In order to normally maintain pins 56 at the point of junction of the two branches of the slot, I provide a yielding cushion for frame 48, this cushion being provided by an arm or rod 59, one end of which is carried by wrist pin 52$^a$, the advance end being in the form of a member 60 having a slot 60$^a$ through which wrist pin 56 extends, this slot carrying a spring-supported block or member which bears against the rear of the pin. Spring 61 is of sufficient power to normally maintain the pin in the desired position during travel of the frame to and from its clamping position, being yieldable to permit the lost motion action to take place under the general operation hereinafter described.

The mounting of arms or levers 51 on disks 52 and the travel of wrist pin 52$^a$ is such that as the latter advances from the position shown in Fig. 2, member or members 50 will be brought into contact with die member 42 prior to the time when wrist pin 52 passes a dead center, so that the length of movement of arms or levers 51 in the advancing direction is sufficient to carry member or members 50 beyond the position of contact with die member 42. However. both member 42 and frame 48 are yieldingly supported, and since the general operation provides that yielding of these parts is to take place at different times instead of concurrently, means are provided for locking one part or the other against movement during this additional movement of the arms or levers 51 and rods 59.

In the general operation, the initial locking against yielding action is had in connection with frame 48, this frame being carried forward to the full extent of movement of arms or levers 51 during the first advancing movement of the frame. To lock the frame against yielding action at this time, the front end of each arm or lever 51 is rocked downwardly so as to provide relative movement between pin 56 and branch 55 of the L-shaped slot, this movement of the arms or levers being provided by a roller or rollers 62 mounted in a bracket 63 carried by plate 29, downward travel of said plate 29 bringing these rollers into contact with the upper faces of arms or levers 51—it being understood that the initial advancing movement of the frame 48 takes place concurrently with the downward movement of plate 29— so that this arm rocking movement is provided as members 50 are approaching the clamping position, placing pins 56 in branches 55 of the slots and thus placing a barrier against any lost motion action between the pins and the arms or levers at this time.

Consequently, when members 50 complete the clamping action with die members 42, the continued advancing movement of the arms or levers 51 will force members 42 rearwardly (Fig. 7) against the tension of spring 47. Since the U-shaped staple is, at this time, clamped between members 42 and 50 with the extreme ends of the staple legs projecting above the top plane of members 42, it will be obvious that this additional advancing movement of members 42 and 50 will bend these projecting leg portions of the staple laterally, the lower front edge of die member 35 acting as a staple-bending member in connection with the top face of member or members 50, thus producing a lateral bending of the extreme ends of the blank and form prongs.

While not absolutely essential, it may be preferred to give a sharper bend at the junction of the prongs and body portion of the staple, and to provide this action I may employ a device which will move the clamping parts vertically to a slight extent while the parts are in this bend-forming position.

This movement of the clamping elements may be provided in any suitable manner, a simple arrangement being to provide a more or less loose mounting between shaft 45 and frames 44 and 48 carried thereby—or the rod or shaft 45 may be loosely mounted relative to its bearing or supports—the purpose being to permit a slight movement in a vertical direction, which movement can be made effective by the use of a lever 64 pivoted to the frame and having a foot or feet extending beneath shaft 45 or frames 44 and 48, the opposite end of lever 64 having a face which is normally located in the path of travel of a member 65 which may be carried by shaft 53 or be secured to disk 52, contact of member 65 with the lever rocking the latter and thus slightly raising the clamping elements with the clamped staple so as to apply pressure on to the bent prongs to produce a more or less die action on the latter while the prongs are underlying die members 35.

This operation not only gives a better bend, but by arranging the lower face of die members 35 beveled, as shown in the drawings, this action of lever 64 can be utilized to practically sharpen the ends of the prongs by a flattening action produced by the upper face of member or members 50 and the lower face of members 45 acting as complemental die members for this purpose during this upward movement provided by lever or levers 64.

As will be understood, the action of lever 64 is but for a short period, this action taking place during the time when wrist pin $52^a$ is approaching, passing and receding from a dead center, a time when the clamping elements are substantially stationary for an appreciable period.

It will be understood that the timing of the various parts is such as not to provide any conflict in movements of parts. For instance, members 50 are brought into clamping position while die members 34 are receding, the lower end of the latter remaining in position for a length of time sufficient only to practically insure that the staple will not pass out of position in advance of clamping action, but being out of contact with such legs when the prong-forming action begins, the more or less beveled lower edge of die member 34 permitting this general action to be obtained, since members 50 can closely approach members 42 while die members 34 still remain in contact with the positioned staple.

As wrist pins $52^a$ continue their motion after passing the dead center, the clamping elements are returned—die members 42 following frame 48 through the action of spring 47—thus returning die members 42 to their normal position, frame 48 continuing its retreating movement, the result being that the formed staple for fastening device is positioned on die members 42 with the prongs projecting forwardly, thus being in position ready for the label-affixing action.

As heretofore pointed out, the oscillating frame is adapted to present a plug of tobacco to the positioned staple or fastening device during the second advancing movement of the frame. To produce this action, a plug delivery device is located in position to discharge a plug of tobacco in front of supporting member or members 50, this positioning action taking place during the earlier portion of the second advancing movement of frame 48, the lower end of the plug delivery device—the latter being presently described in detail—being located above the path of travel of member or members 50. This positioning action requires the presence of a bottom support for the plug in order to properly position the plug on the frame, and while this support may be carried permanently by bar 49, I prefer to employ a separate support for this purpose in order that the apparatus may operate in such manner as to automatically drop the plug after the label has been secured.

This support is in the form of a plate 66 which is carried by a pair of arms 67, these arms being carried by rod or shaft 45, extending upwardly therefrom in rear of rod or shaft 46 and then extending forwardly and carrying plate 66 at the advance end. Plate 66 carries a bracket 66ª to which the forward end of a link 68 is pivotally connected, the rear end of said link being connected to a lever 69, pivotally mounted as at 69ª, and which carries a counterpoise 70, preferably adjustable, the counterpoise lever 69 tending to move the frame formed by arms 67 and plate 66 forwardly. The parts are so arranged that during the major portion of the travel of frame 48, plate 66 will contact with bar 49, the upper face of the plate providing the support referred to. However, this contact of plate 66 and bar 49 is maintained only during such portion of the travel of frame 48 as is permitted by the free movement of arms 67, contact of said arms with rod or shaft 46, or bushings thereon, preventing further movement of this supporting frame toward the front of the machine.

This limitation of movement of plate 66 does not affect the movement of frame 48, the length of oscillating movement of the latter being sufficiently greater to cause frame 48 to continue its retreating movement an additional distance after plate 66 has reached its limit of forward movement, the result being that a space will be opened between the front of bar 49 and plate 66, this space being sufficient to permit the plug to drop from position, the succeeding advance movement of frame 48 again bringing bar 49 into contact with plate 66—closing this space—after which plate 66 advances through the advancing movement of frame 48. The frame 48 and the frame carrying plate 66 may be considered as an oscillatory supporting instrumentality.

Since this relative movement of plate 66 and frame 48 takes place with each retreating movement of frame 48, it will be readily understood that this space must be closed or have less width than the thickness of the plug when the latter is fed to position. Hence, the feeding mechanism for the plug is so located that the plug will be delivered at an intermediate point in the range of movement of frame 48. As will be understood, the particular position may be varied, the drawings showing a position where the plug is fed practically at the time when the space is just about to close, this position giving a maximum period of time between the feeding position and the position where the plug is brought into contact with the formed staple, thus permitting the plug to properly seat itself during the advancing movement of the frame. Since the movement of the plug after release by the feeding mechanism to position on its support is by gravity, this time element will permit correction of any inaccurate feeding which might take place during the operation.

After the plug has been seated on the frame during its second advancing movement, it is carried forward by the frame, the front face of the plug thus being brought into contact with the prongs of the positioned staple or fastening device. During this second advancing movement of frame 48, however, plate 29 is in its upper position, and therefore arms or levers 51 are not rocked on wrist pins 52ª by roller 62, as during the first advancing movement of the frame. Hence pins 56 are retained out of branches 55 of the arm slot and in line with branch 55ª of that slot, thus permitting the relative movement or lost motion effect between pin 56 and arm or lever 51 heretofore described, the parts being in position to permit yielding action of frame 48.

Since it is desired that this yielding action of the frame be made positive, means are provided for holding die member 42 against yielding at this time, this means being in the form of an arm 71 mounted on shaft 46, said shaft also carrying an arm 72 which extends upwardly in a more or less irregular shape to present a roller in the path of travel of the cam 73 mounted on shaft 25 or carried by one of the disks 26, the particular structure being shown more in detail in Fig. 9. Cam 73 is timed to operate arm 71 so as to locate it in rear of supporting die 43 prior to the time when the plug of tobacco reaches a position to contact with the prongs of the staple, arm 71 remaining in this position until after frame 48 begins its retreating movement. Consequently member 42 will be held against yielding action with the result that frame 48 will be brought to a position to contact the face of the plug with die member 42, remaining in this position during the further travel of arms or levers 51 and being subject to the pressure which is applied by spring 61 instead of a positive pressure. This pressure is sufficient to drive the prongs through the label and into the plug of tobacco, but is not sufficient to materially affect the face of the plug.

Arms or levers 51 will continue to advance until wrist pin 52ᵃ again passes the dead center, after which the arms or levers begin their retreating action without changing the position of frame 48 until the wrist pin reaches a point where pin 56 is again located in its normal position with respect to the L-shaped slot, whereupon frame 48 will begin its second retreating action, carrying the completed plug with it. When arms 67 reach their limit of travel, plate 66 will remain stationary and the continued travel of frame 48 will open the space between bar 49 and plate 66 through which space the plug will drop, frame 48 continuing its retreating movement, the succeeding advance movement of the frame being the first advance movement of the succeeding cycle of operations.

While lever 64 will be made operative during the period when the plug is in its advance position—due to the fact that the control of lever operations is provided by the movement of shaft 53—this operation does not affect the staple-applying action, since the entire structure is moved bodily. However, if desired, the movement of levers 64 may, through suitable connection, be controlled from shaft 25, in which case lever action would take place but once during the general cycle of operation.

Any suitable plug feeding device may be employed, the drawings showing one form which is readily adapted for use in connection with the present invention. In this form, shown more particularly in detail in Fig. 11, 74 designates a frame—somewhat skeleton in character—adapted to provide a chute or runway having opposing guide faces between which plugs may freely pass downwardly in an inclined direction, the plugs moving in the plane of the plug width, thus placing the plugs flatwise in the feeding mechanism. The lower end of one set of guides is cut away or omitted to permit free advance of a plug which has passed into the path of movement of frame 48. Mounted on frame 74 is a mechanism for discharging the plugs individually, this mechanism being in the form of a rock shaft 75 carrying an arm 76, one end of said arm carrying an angular plate 77 which, under the rocking movements of shaft 75, passes into and out of the path of travel of a plug through frame 74. Said arm or plate 76 also carries a yieldable member 78 having an extended face and having a pin 78ᵃ extending through a slot in arm 76, member 78 being adapted to contact with the rear face of a plug to restrain its advancing movement.

In the position shown in Fig. 11, the spring support of member 78 is in contact with the rear faces of two plugs, thus frictionally holding them from moving freely downward in frame 74, member 77 being out of the path of movement of the plug, the view indicating the release of a plug previously held by member 77. When shaft 75 is rocked, member 77 will reënter into the path of travel of the plugs and member 78 and its spring support will be moved out of contact with the previously held plugs, the latter then moving down with the lower edge of the lower plug resting on member 77, the plugs moving freely during this action. When shaft 75 is again rocked to reverse the positions—placing the parts in the positions shown in Fig. 11—the spring-supported member 78 will contact with the newly positioned plugs, preventing further downward movement of these plugs, while member 77 will be withdrawn from its plug supporting position, permitting the unheld plug to freely move downward into position. As heretofore indicated, this release action of the lower plug takes place during the second advancing movement of frame 48.

The rocking movements of shaft 75 are provided by mechanism under the control of a roller 79 carried by one of the disks 26, through suitable mechanism. This mechanism is shown in the form of a vertically movable member 80 carrying a laterally extending arm 81, the lower end of member 80 being operatively connected to shaft 75 by a suitable link connection 82.

Shaft 75 carries a counterpoise 83 which operates to normally retain the shaft in position where member 77 is intersecting the path of travel of the plug (Fig. 2) and remains active to retain member 77 in this position during such periods as roller 79 is out of operative contact with a face of arm 81. When, during the operation of the machine, roller 79 is brought into contact with such face of member 81, member 80 is forced downwardly against the action of counterpoise 83, rocking shaft 75 and bringing member 78 and its supporting spring into activity to grip the plugs which are located within the zone of activity of these parts, withdrawing member 77 and permitting the lower plug to be released.

Obviously, roll 79 will be so positioned as to provide this movement of member 80 at the proper time so as to time the release of the lowermost plug. Since roll 79 makes but one orbital movement during the general cycle of operations of the machine, the delivery of a plug can be properly controlled.

As will be understood from the above description, frame 48 and the parts carried thereby are active both in staple-forming as well as in the staple-applying action, die members 42 being similarly active, these members each being yieldable but so arranged as to provide for non-concurrent yielding action, thus enabling these two instrumentalities to provide proper staple formation as well as proper applying action. The operating mechanisms are of simple character and the parts are so arranged as to provide for minimum wear and tear although operative under comparatively high capacity conditions. Obviously, it is necessary only to feed the plugs into the plug delivery apparatus, the latter being shown as adapted for hand feeding but which may obviously be employed in connection with a mechanical feed device for locating the plugs within frame or chute 74, the general structure being such as to be readily located as an attachment to other apparatus. Since the hoppers are adapted to contain a large number of wire blanks, it will be clear that the machine is adapted for continuous rather than intermittent operation, being substantially automatic in general operation.

In the particular construction shown, no means are provided for placing the label strip on the plug preliminary to its entering into the feeding apparatus of the machine. This placing of the label in position can be readily performed by a suitable machine, the back of the label carrying suitable adhesive by which the label can be temporarily secured in position on the plug, the latter then being introduced into the feeding mechanism and the machine automatically placing the desired number of staples to effectively affix or apply the label in position. Since it is unnecessary that the adhesive connection remain materially effective after such staples have been applied, there is no necessity for any careful application of adhesive throughout the label face, and loosening of the label through drying of adhesive is immaterial.

As it may occur that a wire blank may, during its various treatments in the shaping operations, become improperly shaped or improperly positioned, or through some failure of operative conditions the formed staple is not properly affixed to the plug and carried away from die member 42 during the receding movement of the plug, means are provided for correcting the difficulty by moving such imperfect or unattached staple from position in connection with die member 42, this being provided in order that the general operation may not be affected by such failure. This action is provided by the particular configuration of the lower end of die 34, this portion of the die having a beveled face 85 of a somewhat irregular contour (Figs. 12 and 13), this face being located in advance of rib 34ª in approaching die 42 so that should a staple remain in die member 42 when plate 29 operates to bring the succeeding staple-forming blank into its staple-completing position, this beveled face will contact with the projecting prongs and force such imperfect staple from its seat in die member 42, throwing the staple from the machine and leaving the die member free to receive the succeeding embryo staple.

While I have herein shown and described one embodiment of the invention, it will be obvious that the invention is capable of wide change and variation to meet the various exigencies of use, and I desire to be understood as reserving the right to make any and all such changes or modifications as may be found necessary or essential, in so far as the same may fall within the spirit and scope of the invention as expressed in the accompanying claims when broadly construed.

Having thus described my invention, what I claim as new, is:

1. In apparatus for tagging or labeling plugs of tobacco and in combination, a wire blank supply, mechanism for shaping the blank to a pronged semi-circular configuration and with the prongs projecting normal to the plane of the semi-circular portion and in the direction of label advance, and means for advancing the plug with its label to apply the shaped blank with the prongs of the blank extending into the plug through the label.

2. In apparatus for tagging or labeling plugs of tobacco and in combination, a wire blank supply, staple-forming mechanism operative to produce from a blank a staple having a semi-circular body portion and prongs extending laterally from the ends of the body portion, said mechanism including a support for the shaped staple and wherein the staple prongs project from the support, and means for advancing the plug with its label to said support, whereby the staple prongs will be caused to penetrate the label and plug and position the body portion upon the label.

3. In apparatus for tagging or labeling plugs of tobacco and in combination, staple-forming mechanism operative to produce a wire staple having a semi-circular body portion and prongs extending laterally of the ends of the body portion, said mechanism including a support for the shaped staple and having a recess to receive the staple body portion with the prongs projecting therefrom, a support for the plug with its label, and means for advancing the plug support to bring the label into contact with the staple body portion, whereby the staple prongs will penetrate the label and the plug to apply the label.

4. In apparatus for tagging or labeling plugs of tobacco and in combination, staple-forming mechanism operative to produce a wire staple having a semi-circular body portion and prongs extending laterally of the ends of the body portion, said mechanism including a support for the shaped staple and having a recess to receive the staple body portion with the prongs projecting therefrom, a support for the plug with its label, said support being active in the staple-shaping operation, and means for advancing the plug support to bring the label into contact with the staple body portion, whereby the staple prongs will penetrate the label and the plug to apply the label.

5. In apparatus for tagging or labeling plugs of tobacco and in combination, staple-forming mechanism operative to produce a wire staple having a semi-circular body portion and prongs extending laterally of the ends of the body portion, said mechanism including a support for the shaped staple and having a recess to receive the staple body portion with the prongs projecting therefrom, a support for the plug with its label, said staple support being yieldably mounted and movable in the direction of yield during staple shaping, means for advancing the plug and its label to contact the label and the staple body portion, and means for preventing support yield during label presentation, whereby the prongs will penetrate the label and plug.

6. In apparatus for tagging or labeling plugs of tobacco and in combination, staple-forming mechanism for producing wire staples having a semi-circular body portion and prongs projecting laterally from the ends of the body portion, said mechanism including a staple support operative in the prong formation and forming the support for the staple during label application, the prongs of the staple projecting from said support, and means for presenting the plug with its label to said support to bring the label into underlying relation to the staple body portion, said presenting means moving in a direction to cause prong penetration of the label and plug during the presentation movement.

7. In apparatus for tagging or labeling plugs of tobacco and in combination, staple-forming mechanism operative to produce a wire staple having prongs projecting laterally from the staple body portion and having the body portion varied in contour from a straight line connecting the prongs, and means for presenting the plug with its label to position the staple body-portion in overlying relation to the label and with the prongs penetrating the label and article.

8. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently.

9. In apparatus for tagging or labeling plugs of tobacco and in combination, staple-forming means adapted to locate a staple at a label-applying station, mechanism for presenting a plug with its label at said station, and plug feeding means adapted to deliver plugs with labels to said mechanism individually and intermittently, said mechanism including a support movable toward and from said station, said plug feeding means being operative to deliver the plug and label during the support advancing movement.

10. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said mechanism including a support movable toward and from said station, said feeding means being fixedly positioned with respect to said station and operative to deliver the plug and label to said support at an intermediate point in the travel of the latter.

11. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said mechanism including an oscillating support movable relative to said station and said feeding means with the length of movement greater than the distance between the station and feeding means.

12. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said feeding means being made operative to deliver the plug and label during the advance movement of the support.

13. In apparatus for tagging or labeling plugs of tobacco and in combination, staple-forming means adapted to locate a staple at a label applying station, mechanism for presenting a plug with its label to said station, and plug feeding means adapted to deliver plugs with labels to said mechanism individually and intermittently, said mechanism including an oscillatory supporting instrumentality, said feeding means being operative at a point intermediate the extremes of instrumentality movement, and means for controlling feed movements to periods of instrumentality movement, said instrumentality having means whereby the plug and its applied label will be discharged from the instrumentality during the return movement of the latter.

14. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said mechanism including an oscillatory member movable beyond said feeding means, and a coöperating element movable with said member during predetermined lengths of movement of the latter, said member being movable independently of the element during other portions of travel of the member.

15. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said mechanism including an oscillatory supporting instrumentality comprising a pair of members combinedly forming a support for the plug and its label, means for moving one of said members positively in fixed paths of movement, and means whereby the other member will be held in contact with the positively-moved member during a predetermined portion of the length of movement of the latter.

16. In apparatus for tagging or labeling plugs of tobacco and in combination, staple-shaping mechanism including a stationary die, a die normally alined with the shaping die for supporting the staple during the label applying operation, and means for moving said dies relatively to each other to complete the staple formation, said means including an oscillatory member adapted to clamp the staple during the staple completing operation.

17. In apparatus for tagging or labeling plugs of tobacco and in combination, staple-shaping mechanism including a stationary die, a die normally alined with the shaping die for supporting the staple during the label applying operation, a die movable relative to said stationary die and coöperating therewith to partially shape the staple and locate it in the supporting die, and means for moving the stationary and supporting dies relative to each other to complete the staple formation, said means including an oscillatory member adapted to clamp the staple during the staple completing operation.

18. In apparatus for tagging or labeling plugs of tobacco and in combination, staple-shaping mechanism including a stationary die, a die normally alined with the shaping die for supporting the staple during the label applying operation, a die movable relative to said stationary die and coöperating therewith to partially shape the staple and locate it in the supporting die, and means for moving the stationary and supporting dies relative to each other to complete the staple formation, said means including an oscillatory member adapted to clamp the staple during the staple completing operation, the movements of the clamping member and the movable die being relatively timed to provide clamping action in succession to the positioning action.

19. In apparatus for tagging or labeling plugs of tobacco and in combination, staple shaping mechanism including a stationary die, a die normally alined with the shaping die for supporting the staple during the label applying operation, and means for moving said dies relatively to each other to complete the staple formation, said means including an oscillatory member adapted to clamp the staple during the staple completing operation, said supporting die being yieldable in directions transverse to the direction of movement of the movable die.

20. In apparatus for tagging or labeling plugs of tobacco and in combination, staple-shaping mechanism including a stationary die, a staple-supporting die normally alined with the shaping die and yieldable laterally of said die, a die complemental to the shaping die and movable to locate the staple in said supporting die with staple portions extending into the shaping die, and means for moving said supporting die in its direction of yield, said means including an oscillatory member coöperating with the supporting die to clamp the staple, whereby the projecting ends of the latter will be bent to form staple prongs extending laterally of the staple body portion.

21. In apparatus for tagging or labeling plugs of tobacco and in combination, staple-shaping mechanism including a stationary die having a longitudinal channel, a staple-supporting die having a recess normally alined with said channel, a die coöperating with the stationary die in partially shaping the staple and movable to position the staple body portion within said recess, a yieldable support for said supporting die, and a member movable toward and from said supporting die for clamping the staple thereto, said latter member being operative to shift the supporting die in its direction of yield in succession to the clamping action to complete the staple formation.

22. In apparatus for tagging or labeling plugs of tobacco and in combination, staple-shaping mechanism including a stationary die, a die normally alined with the shaping die for supporting the staple during the label applying operation, and means for moving said dies relatively to each other to complete the staple formation, said means including an oscillatory member adapted to clamp the staple during the staple completing operation, and means for moving the staple-clamping members relative to said stationary die to complete prong shaping.

23. In apparatus for tagging or labeling plugs of tobacco and in combination, staple-shaping mechanism including a stationary die, a die normally alined with the shaping die for supporting the staple during the label applying operation, and means for moving said dies relatively to each other to complete the staple formation, said means including an oscillatory member adapted to clamp the staple during the staple completing operation, and means for moving the staple-clamping members relative to said stationary die to complete prong shaping, said latter means including a time-controlled lever operative to shift the axis of said oscillatory member.

24. In apparatus for tagging or labeling plugs of tobacco and in combination, a supporting die, means for positioning an embryo staple on said die, and mechanism for successively completing the staple and for applying it to a plug with its label, said mechanism including an instrumentality movable toward and from said die, successive movements of said instrumentality in the same direction being operative to complete the staple and to present the plug with its label to the completed staple.

25. In apparatus for tagging or labeling plugs of tobacco and in combination, a supporting die, means for positioning an embryo staple on said die, and mechanism for successively completing the staple and for applying it to a plug and its label, said mechanism including an instrumentality movable toward and from said die in successive cycles, said instrumentality including a seat for the plug with its label, and means whereby the plug with its label will be presented to the die and its supported staple during alternate cycles.

26. In apparatus for tagging or labeling plugs of tobacco and in combination, a supporting die, means for positioning an embryo staple on said die, and mechanism for successively completing the staple and for applying it to a plug with its label, said mechanism including an instrumentality movable toward and from said die in successive cycles, said instrumentality including a seat for the plug with its label, and means whereby said instrumentality will coöperate with said die in the staple formation during alternate cycles.

27. In apparatus for tagging or labeling plugs of tobacco and in combination, a supporting die, means for positioning an embryo staple on said die, and mechanism for successively completing the staple and for applying it to a plug with its label, said mechanism including an instrumentality movable toward and from said die in successive cycles, said instrumentality including a seat for the plug with its label, and means whereby said instrumentality will coöperate with said die in the staple formation during one cycle, and means for positioning the plug with its label on said seat during the succeeding cycle, whereby the plug with its label will be presented to a completed staple.

28. In apparatus for tagging or labeling plugs of tobacco and in combination, a supporting die, means for positioning an embryo staple on said die, and mechanism for successively completing the staple and for applying it to a plug with its label, said mechanism including an oscillatory instrumentality having a member movable toward and from said die, means for oscillating said instrumentality in successive cycles, said means including a shiftable arm, and operative connections between the member and said arm to provide relative yielding action between the arm and member during one cycle and non-yielding action therebetween during the succeeding cycle.

29. In apparatus for tagging or labeling plugs of tobacco and in combination, a supporting die, means for positioning an embryo staple on said die, and mechanism for successively completing the staple and for applying it to a plug with its label, said mechanism including an oscillatory instrumentality having a member movable toward and from said die, means for oscillating said instrumentality in successive cycles, said means including a shiftable arm, and operative connections between the member and said arm to provide relative yielding action between the arm and member during one cycle and non-yielding action therebetween during the succeeding cycle, and means rendered active by movements of the positioning means for selecting the period of non-yielding connection.

30. In apparatus for tagging or labeling plugs of tobacco and in combination, a supporting die, means for positioning an embryo staple on said die, and mechanism for successively completing the staple and for applying it to a plug with its label, said mechanism including an oscillatory instrumentality having a member movable toward and from said die, means for oscillating said instrumentality, said means including a shiftable arm, operative connections between the member and said arm and normally operative to provide relative yielding connection between the arm and member, and means controlled by movements of the positioning means for rendering such connections non-yielding.

31. In apparatus for tagging or labeling plugs of tobacco and in combination, a yieldable supporting die, means for positioning an embryo wire staple on said die, and mechanism for successively completing the staple and for applying it to a plug with its label, said mechanism including an oscillatory instrumentality having a member movable toward and from said die, means for oscillating said instrumentality in successive cycles, said means including a shiftable arm, operative connections between the member and said arm and normally operative to provide relative yielding connection between the arm and member, means controlled by movements of the positioning means for rendering such connections non-yielding, and cam-control means for rendering said die non-yielding.

32. In apparatus for tagging or labeling plugs of tobacco and in combination, a yieldable supporting die, means for positioning an embryo wire staple on said die, and mechanism for successively completing the staple and for applying it to a plug with its label, said mechanism including an oscillatory instrumentality having a member movable toward and from said die, means for oscillating said instrumentality in successive cycles, said means including a shiftable arm, operative connections between the member and said arm and normally operative to provide relative yielding connection between the arm and member, means controlled by movements of the positioning means for rendering such connections non-yielding, and cam-control means for rendering said die non-yielding, the control structures of said member and said die being relatively timed to provide non-yielding action of one element during yielding activity of the other element.

33. In apparatus for tagging or labeling plugs of tobacco and in combination, a yieldable supporting die, means for positioning an embryo wire staple on said die, and mechanism for successively completing the staple and for applying it to a plug with its label, said mechanism including an oscillatory instrumentality having a member movable toward and from said die, means for oscillating said instrumentality in successive cycles, said means including a shiftable arm, operative connections between the member and said arm and normally operative to provide relative yielding connection between the arm and member, means controlled by movements of the positioning means for rendering such connections non-yielding, and cam-control means for rendering said die non-yielding, said connection control being operative to provide non-yielding connection during staple completion operation.

34. In apparatus for tagging or labeling plugs of tobacco and in combination, a yieldable supporting die, means for positioning an embryo wire staple on said die, and mechanism for successively completing the staple and for applying it to a plug with its label, said mechanism including an oscillatory instrumentality having a member movable toward and from said die, means for oscillating said instrumentality in successive cycles, said means including a shiftable arm, operative connections between the member and said arm and normally operative to provide relative yielding connection between the arm and member, means controlled by movements of the positioning means for rendering such connections non-yielding, and cam-control means for rendering said die non-yielding, said cam-control means being timed to render said die non-yielding during the staple-applying operation.

35. In apparatus for tagging or labeling plug tobacco and in combination, staple-shaping mechanism including a stationary die and a reciprocating die complemental thereto, a supporting die normally in the path of travel of the shaped staple, a pivoted instrumentality adapted to coöperate with the supporting die to complete the staple and to present a plug with its label to the completed staple to apply the label, and means for oscillating said instrumentality, said instrumentality and die movements being relatively timed to provide an instrumentality oscillation intermediate each staple positioning movement of the movable die.

36. In apparatus for tagging or labeling plug tobacco and in combination, staple-shaping mechanism including a stationary die and a reciprocating die complemental thereto, a supporting die normally in the path of travel of the shaped staple, a pivoted instrumentality adapted to coöperate with the supporting die to complete the staple and to present a plug with its label to the completed staple to apply the label, and means for oscillating said instrumentality, said instrumentality and die movements being relatively timed to provide an instrumentality oscillation intermediate each staple positioning movement of the movable die, said oscillating means including an arm operatively connected to said instrumentality, a rotatable element, and a pin connection between said arm and said element.

37. In apparatus for tagging or labeling plug tobacco and in combination, staple-shaping mechanism including a stationary die and a reciprocating die complemental thereto, a supporting die normally in the path of travel of the shaped staple, a pivoted instrumentality adapted to coöperate with the supporting die to complete the staple and to present a plug with its label to the completed staple to apply the label, and means for oscillating said instrumentality, said instrumentality and die movements being relatively timed to provide an instrumentality oscillation intermediate each staple positioning movement of the movable die, said oscillating means including a crank arm having an L-shaped slot, a pin carried by said member and extending into said slot, and an arm carrying a yieldable member normally engaging said pin.

38. In apparatus for tagging or labeling plug tobacco and in combination, staple-shaping mechanism including a stationary die and a reciprocating die complemental thereto, a supporting die normally in the path of travel of the shaped staple, a pivoted instrumentality adapted to coöperate with the supporting die to complete the staple and to present a plug with its label to the completed staple to apply the label, and means for oscillating said instrumentality, said instrumentality and die movements being relatively timed to provide an instrumentality oscillation intermediate each staple positioning movement of the movable die, said oscillating means including a weighted crank arm having an L-shaped slot, a pin carried by said instrumentality and extending into said slot, said pin being normally held in alinement with both branches of the slot, an arm carrying a yieldable member coöperating with said pin and providing yield during movements of the pin in one of said slot branches, said movable die carrying means for shifting said crank arm to locate said pin in the other branch of said slot.

39. In apparatus for tagging or labeling plug tobacco and in combination, staple-shaping mechanism including a stationary die and a reciprocating die complemental thereto, a supporting die normally in the path of travel of the shaped staple, a pivoted instrumentality adapted to coöperate with the supporting die to complete the staple and to present a plug with its label to the completed staple to apply the label, and means for oscillating said instrumentality, said instrumentality and die movements being relatively timed to provide an instrumentality oscillation intermediate each staple positioning movement of the movable die, said instrumentality including a pair of members, one of said members being operatively connected to said oscillating means, the other of said members normally contacting with said first-mentioned member to provide a seat for the plug, and means whereby the length of movement of the second-mentioned member is permanently less than the length of movement of the first-mentioned member.

40. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said feeding means including a chute or runway for the plugs, and means for controlling the passage of the plugs through said runway.

41. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said feeding means including a chute or runway for the plugs, and means for controlling the passage of the plugs through said runway, said latter means operating in synchronism with the staple-forming mechanism.

42. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said feeding means including a chute or runway for the plugs, and means for controlling the passage of the plugs through said runway, said means including a rock shaft carrying a plug support and a plug holding structure adapted to be brought into activity alternatively, said shaft being normally in one position, and means timed with respect to the staple-forming mechanism for rocking said shaft during a predetermined period.

43. In apparatus for tagging or labeling plugs of tobacco and in combination, staple-forming means adapted to locate a staple at a label applying station, mechanism for presenting a plug with its label at said station, and plug feeding means adapted to deliver plugs with labels to said mechanism individually and intermittently, said feeding means including a chute or runway for the plugs, and means for controlling the passage of the plugs through said runway, said means including a rock shaft carrying a plug support and a plug-holding structure adapted to be brought into activity alternatively, a weighted arm normally maintaining said plug support active to prevent plug feed, and means timed with respect to the staple-forming mechanism for rocking said shaft to frictionally engage predetermined plugs and release the plug to be delivered.

In testimony whereof I have hereunto set my hand.

JONATHAN PETERSON.